United States Patent [19]
Navarro et al.

[11] Patent Number: 5,498,466
[45] Date of Patent: Mar. 12, 1996

[54] INTUMESCENT COMPOSITE

[75] Inventors: Mario Navarro, New Tripoli; Gabe DiMarino, Chalfont, both of Pa.

[73] Assignees: International Protective Coatings Corp., Ocean, N.J.; Pyro-Tech Industries, Inc., Hatfield, Pa.

[21] Appl. No.: 30,691

[22] Filed: Mar. 12, 1993

[51] Int. Cl.⁶ ................................................ B32B 9/00
[52] U.S. Cl. ............... 428/408; 428/71; 428/212; 428/305.5; 428/305.6; 428/319.1; 428/913; 428/306.6
[58] Field of Search ................ 428/212, 71, 72, 428/122, 402, 305.5, 305.6, 319.1, 408, 913, 921; 523/179, 129; 521/82, 92; 423/385.5

[56] References Cited

U.S. PATENT DOCUMENTS

| | | | |
|---|---|---|---|
| 3,810,862 | 5/1974 | Mathis et al. | 260/42.45 |
| 4,104,073 | 8/1978 | Koide et al. | |
| 4,253,972 | 3/1981 | Fleenor, Jr. | |
| 4,273,879 | 6/1981 | Langer et al. | 521/91 |
| 4,277,532 | 7/1981 | Czepel et al. | |
| 4,364,210 | 12/1982 | Fleming et al. | |
| 4,467,577 | 8/1984 | Licht | |
| 4,529,467 | 7/1985 | Ward et al. | |
| 4,588,523 | 5/1986 | Tashlick et al. | |
| 4,599,369 | 7/1986 | Malcolm-Brown | |
| 4,725,457 | 2/1988 | Ward et al. | 427/385.5 |
| 4,740,527 | 4/1988 | von Bonin | 521/105 |
| 4,808,476 | 2/1989 | Mikus et al. | 428/413 |
| 4,816,312 | 3/1989 | Annemaier et al. | |
| 4,850,385 | 7/1989 | Harbeke | |
| 4,857,364 | 8/1989 | von Bonin | 427/255 |
| 4,888,925 | 12/1989 | Harbeke | |
| 4,894,966 | 1/1990 | Bailey et al. | |
| 4,945,015 | 7/1990 | Milner et al. | 523/179 |
| 4,951,442 | 8/1990 | Harbeke, Jr. | |
| 4,965,296 | 10/1990 | Hastings | 523/179 |
| 5,058,341 | 10/1991 | Harbeke, Jr. | |
| 5,103,609 | 4/1992 | Thoreson et al. | |
| 5,132,054 | 7/1992 | Stahl | 252/606 |
| 5,137,658 | 8/1992 | Stahl | 252/606 |
| 5,167,868 | 12/1992 | Willey et al. | 252/502 |
| 5,173,515 | 12/1992 | von Bonin et al. | 521/103 |

*Primary Examiner*—Patrick J. Ryan
*Assistant Examiner*—William A. Krynski
*Attorney, Agent, or Firm*—R. Anthony Diehl; Steve Mendelsohn; William H. Murray

[57] ABSTRACT

An intumescent firestop device having a layer of non-curing moldable two-stage intumescent composite and a restraining layer. When the firestop device is installed around a pipe near the wall opening through which the pipe runs, the intumescent composite exudes into the annular space between the pipe and the wall opening thereby forming a cold-gas seal. The composite is a two-stage intumescent composite that contains two different intumescent components that begin to intumesce at two different temperatures to form a hard char.

7 Claims, 2 Drawing Sheets

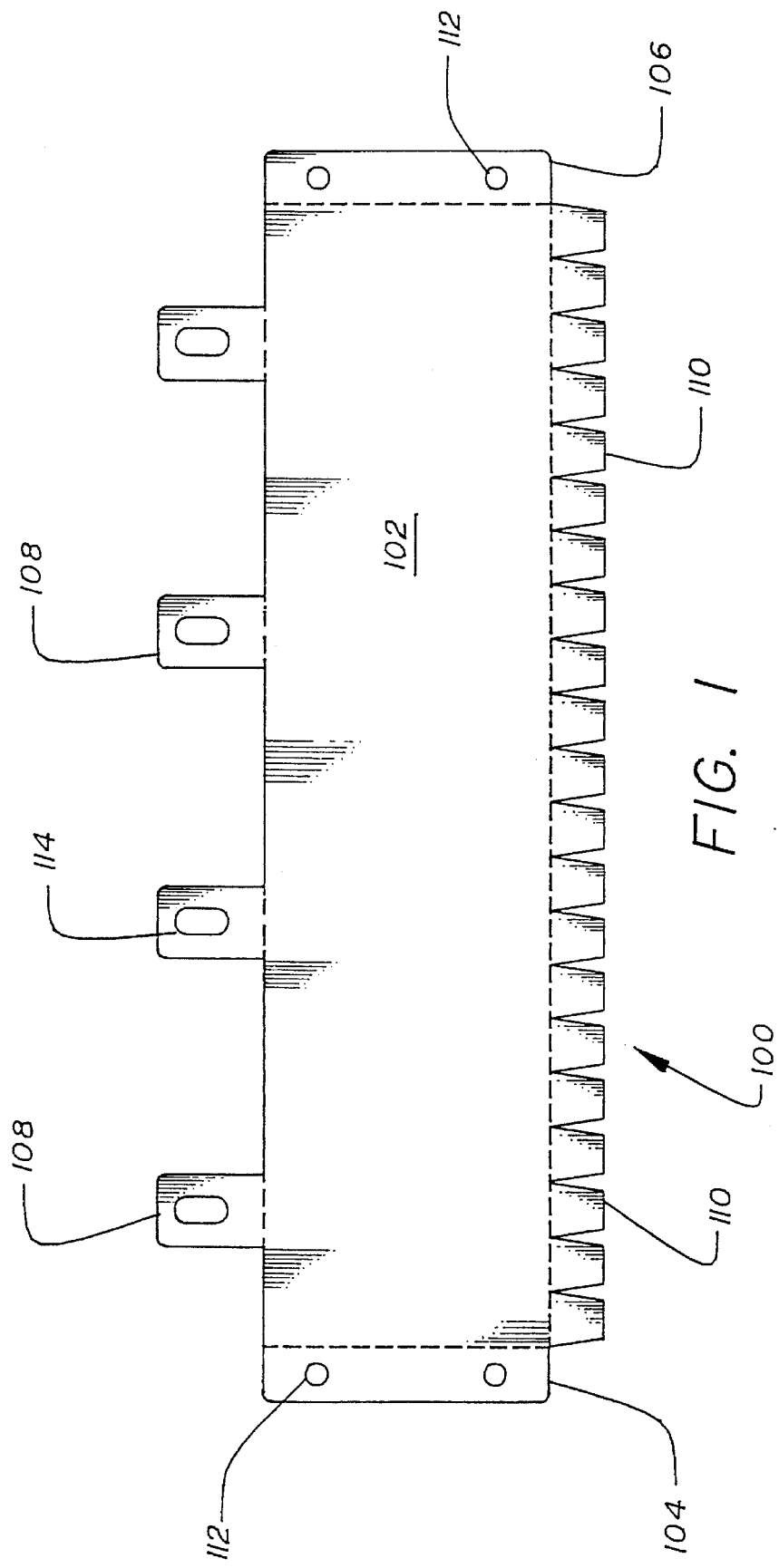

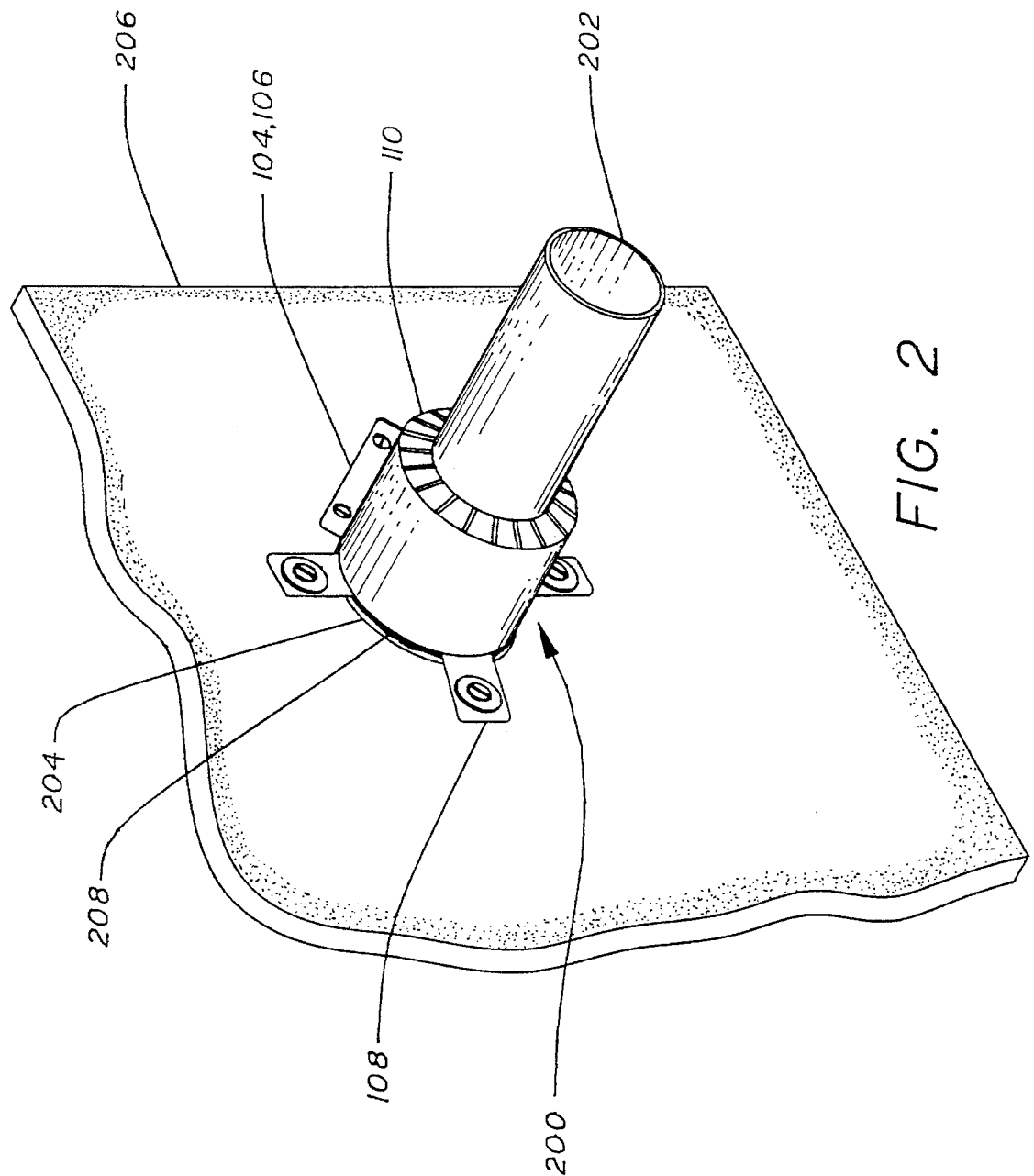

INTUMESCENT COMPOSITE

BACKGROUND OF THE INVENTION

1. Field of the Invention

The present invention relates to intumescent composites and, in particular, to an intumescent firestop device, a method for manufacturing the device, and an intumescent composite for the device.

2. Statement of Related Art

An intumescent firestop device is used to prevent fire from spreading from one room to another through an opening or aperture in a wall, floor, or ceiling through which a pipe runs. A conventional firestop device is wrapped around a pipe (e.g., a PVC plastic pipe) adjacent to the wall (or floor or ceiling) opening. If a fire breaks out in the room, the intumescent material within the firestop device will begin to intumesce (i.e., expand) when the temperature reaches a certain level. The expansion of the intumescent material is directed inward by the outer restraining layer of the firestop device. As a result, the intumescing material crushes the pipe, which is softened by the heat of the fire, and closes off the opening in the wall with a hard char. The resulting hard char must be fire resistant, a thermal insulator, a smoke depressant, and able to withstand the forces exerted by a stream of water from a fire hose.

Many conventional firestop devices require field installation, whereby foil-lined strips of intumescent material are wrapped around a pipe and then a restraining collar is wrapped around the intumescent material and secured by screws or straps. In order to create a cold-gas seal, caulk must be used to fill the annular space between the outside of the firestop device and the opening in the wall.

U.S. Patent No. 4,951,442 (Harbeke, Jr.) discloses a pre-formed firestop collar assembly made of two rigid semi-circular bands that are connected at a hinge line. Each half comprises a rigid restraining layer and two layers of solid intumescent composite. The two layers of solid intumescent composite and the restraining layer must be glued together. Because the intumescent composite is a solid, caulking must still be used to form a cold-gas seal.

In addition, the firestop devices of Harbeke, Jr. require some mechanism, such as foil lining, screws, or metal tabs, to provide heat transfer to ensure that the firestop device starts to intumesce at an appropriate ambient temperature and continues to intumesce at an adequate rate.

SUMMARY OF THE INVENTION

In a preferred embodiment, the present invention is an intumescent composite having a first intumescent component, a second intumescent component, a blowing agent, and a char promoter. The first intumescent component intumesces at a first temperature and the second intumescent component intumesces at a second temperature, where the second temperature is different from the first temperature.

In another preferred embodiment, the present invention is an intumescent composite having a first intumescent component and a binder. The first intumescent component is suspended in the binder. The intumescent composite is a moldable putty.

In yet another preferred embodiment, the present invention is a firestop device having a restraining layer and a layer of moldable intumescent composite adjacent to the restraining layer.

In still another preferred embodiment, the present invention is a firestop device having a restraining layer and a layer of intumescent composite adjacent to the restraining layer. The intumescent composite comprise a first intumescent component that intumesces at a first temperature and a second intumescent component that intumesces at a second temperature, where the second temperature is different from the first temperature.

The present invention is also a method for manufacturing a firestop device having a restraining layer and a layer of moldable intumescent composite adjacent to the restraining layer. According to a preferred embodiment of the method of the present invention, a first sheet of a material is placed onto a die, where the material is of a composition that does not easily adhere to the moldable intumescent composite. The moldable intumescent composite is placed onto the first sheet. A second sheet is placed onto the moldable intumescent composite. Pressure is applied to the second sheet to force the moldable intumescent composite into the die. One of the first or second sheets is removed to expose a surface of the moldable intumescent composite. The restraining layer is placed onto the exposed surface of the moldable intumescent composite.

It is an object of the present invention to provide an intumescent composite that is moldable.

It is another object of the present invention to provide an intumescent composite that is a non-curing putty.

It is another object of the present invention to provide a two-stage intumescent composite that has two intumescent components, each of which begins to intumesce at a different temperature.

It is another object of the present invention to provide an intumescent composite that intumesces to yield a hard char that is fire resistant, a thermal insulator, a smoke depressant, and able to withstand the forces exerted by a stream of water from a fire hose.

It is another object of the present invention to provide a firestop device having an intumescent composite with the aforementioned objects.

It is another object of the present invention to provide a firestop device having an intumescent composite that exudes into the annular space between a pipe and an aperture to form a cold-gas seal when the firestop device is installed around the pipe adjacent to the aperture.

It is another object of the present invention to provide a flexible firestop device that is easily installed around a pipe.

It is another object of the present invention to provide a firestop device in which no glue or other sealant is required to join the restraining layer and the intumescent composite.

It is another object of the present invention to provide an efficient method of manufacturing a firestop device with the aforementioned objects.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a plan view of the restraining layer of an intumescent firestop device according to a preferred embodiment of the present invention; and FIG. 2 shows an intumescent firestop device according to a preferred embodiment the present invention after installation on a pipe.

DETAILED DESCRIPTION OF THE INVENTION

The present invention is an intumescent composite, a firestop device that uses that intumescent composite, and a method for manufacturing that firestop device. According to a preferred embodiment of the present invention, the intumescent composite is a non-curing, moldable, two-stage intumescent putty that contains two different intumescent components that begin to intumesce at two different temperatures.

A preferred embodiment of the firestop device of the present invention is a two-layer assembly—one layer being made of the intumescent composite according to the present invention and the other layer being a flexible restraining layer made of durable galvanized steel. The firestop device is installed by wrapping the two-layer assembly around a pipe and anchoring the device to the adjacent wall.

No caulking is required during installation of the firestop device of the present invention, because the moldable intumescent composite exudes during assembly to fill the annular space between the restraining layer and the wall opening. Moreover, no extraneous mechanisms for heat transfer are required, because the first intumescent component of the two-stage intumescent composite starts to intumesce at a sufficiently low temperature and the second intumescent component continues the intumescing process at sufficient rates as ambient temperature increases.

Referring now to FIG. 1, there is shown a plan view of restraining layer 100 of an intumescent firestop device according to a preferred embodiment of the present invention. Restraining layer 100 is formed from a sheet of 24-gauge galvanized steel. Those skilled in the art will understand that thicker or thinner sheets of galvanized steel may be used in alternative preferred embodiments. Restraining layer 100 has a metallic band 102, first and second end portions 104 and 106, four attachment tabs 108, and a plurality of support tabs 110. In the assembled firestop device, a layer of intumescent composite (not shown) abuts metallic band 102. The layer of intumescent composite is of approximately the same area as metallic band 102 and is approximately as thick as the support tabs 110 are long.

No glue or other sealant is required to join the intumescent composite to restraining layer 100, because the intumescent composite adheres to the galvanized steel of restraining layer 100.

The firestop device is installed by wrapping it around a pipe near the opening or aperture in a wall (or floor or ceiling) with the layer of intumescent composite facing toward the pipe. The pipe may be a plastic (e.g., polyvinylchloride) pipe, a fiberglass pipe, or a pipe of any other suitable material. The firestop device is secured to the pipe by bolting end portions 104 and 106 together through holes 112. In a preferred embodiment, first and second end portions 104 and 106 are pre-bent away from the layer of intumescent composite (about 90 degrees). The firestop device is secured to the wall by screwing attachment tabs 108 to the wall through holes 114. In a preferred embodiment, attachment tabs 108 are pre-bent away from the layer of intumescent composite (about 90 degrees). The intumescent composite is held in place between restraining layer 100 and the pipe by support tabs 110 which are preferably pre-bent toward the layer of intumescent composite (about 90 degrees).

Referring now to FIG. 2, there is shown an intumescent firestop device 200 according to a preferred embodiment the present invention after it is installed. Firestop device 200 is wrapped around pipe 202 adjacent to aperture 204 in wall 206. End portions 104 and 106 of restraining layer 100 are bolted together to secure firestop device 200. Attachment tabs 108 are bolted to wall 206 to secure firestop device 200 to wall 206. Support tabs 110 hold composite material 208 in place. During the installation process, some of moldable composite material 208 is exuded into the annular space between restraining layer 100 and aperture 204 in wall 206 thereby forming a cold-gas seal. Pipe 202 and wall 206 form no part of the present invention.

According to a preferred embodiment, the composite material of the present invention is made by suspending two intumescent components, a blowing agent, and a char promoter in a viscous liquid binder to yield a non-curing, moldable, two-stage intumescent composite.

The first intumescent component preferably includes an acid-treated intercalated graphite flake such as TG-317, distributed by UCAR Carbon Company Inc., P.O. Box 6116, Cleveland, Ohio 44101. The acid-treated intercalated graphite flake provides intumescence and carbonific insulation after intumescing.

The second intumescent component preferably includes a mixture of a polyhydric alcohol and a melamine/uninhibited formaldehyde syrup. The polyhydric alcohol is preferably dipentaerythritol, distributed as Di-Penta by Perstorp Polyols, Perstorp AB, S-284 80 Perstorp, Sweden. The melamine/uninhibited formaldehyde syrup is preferably triamino-s-triazine, distributed as Melamine Crystal GP by Melamine Chemical, Inc., River Road, Highway 18, P.O. Box 748, Donaldsonville, La. 70346. The polyhydric alcohol releases gas, intumesces, and provides carbonific insulation after intumescing. The melamine/uninhibited formaldehyde syrup acts as a blowing agent for the polyhydric alcohol to improve continuity in the intumescing foam.

The blowing agent preferably includes a preparation with carbonate compounds and polycarbonic acids such as Hydrocerol® BIH, manufactured by Boehringer Ingelheim and distributed by Henley Chemical, Inc., 50 Chestnut Ridge Road, Montvale, N.J. 07645. The carbonate compound/polycarbonic acid mixture acts as a blowing agent and a catalytic acid.

The char promoter preferably includes a chlorinated paraffin such as Chlorez 700 and a chlorinated paraffin/resin mixture such as Chlorovis 150-A. Both Chlorez 700 and Chlorovis 150-A are distributed by Dover Chemical Corp., West Fifteenth and Davis Streets, P.O. Box 40, Dover, Ohio 44622. The chlorinated paraffin and chlorinated paraffin/resin mixture act as blowing agents and contribute carbon to the hard char that remains after the intumescent composite has intumesced.

The binder preferably includes a plasticized rubber and more particularly a polyisobutylene such as Polybutene 128, distributed by Synthetic Oils & Lubricants of Texas, Inc. (SOLTEX), 15603 Kuykendahl, Suite 210, Houston, Tex. 77090. The binder is a non-curing liquid that makes the intumescent composite a non-curing, moldable putty.

Table I presents a preferred formula for the intumescent composite of the present invention. Each ingredient is pre-weighed prior to mixing in a mixtruder (a kneading machine that mixes when driven in one direction and extrudes when driven in the other direction). Ingredient Nos. 1 through 5 are added into the mixtruder. The mixtruder blade and screw are driven in the mix direction to mix the ingredients for two to three minutes. The mixtruder is stopped and Ingredients Nos. 6 and 7 are added. The ingredients are mixed for about 10 minutes or until the composite is uniform. The mixtruder is then changed from the mix direction to the extrude direction. The composite is extruded into one-inch by four-inch rectangular bars and broken off at desired lengths. The composite may then be checked for density, needle penetration, and heated volumetric expansion.

TABLE I

FORMULA FOR INTUMESCENT COMPOSITE

| No. | INGREDIENT | PRIMARY FUNCTION | BY WEIGHT |
|---|---|---|---|
| 1 | Hydrocerol BIH | Blowing agent | 4.4 +/− 0.1% |
| 2 | UCAR TG-317 Graphite | Intumescent | 40.0 +/− 2.0% |
| 3 | Di-Pentaerythritol | Intumescent | 8.0 +/− 0.4% |
| 4 | Melamine Crystal | Blowing agent | 8.0 +/− 0.4% |
| 5 | Chlorez 700 Paraffin | Char promoter | 3.2 +/− 0.2% |
| 6 | Chlorovis 150-A Paraff. | Char promoter | 5.4 +/− 0.3% |
| 7 | Soltex 128 Polybutene | Binder | 31.0 +/− 1.6% |

The intumescent composite of Table I contains two different intumescent components that begin to intumesce at two different temperatures. The dipentaerythritol begins to intumesce at about 220 degrees centigrade, while the intercalated graphite flake begins to intumesce at about 260 degrees centigrade. In a typical burn test for intumescent firestop devices, the temperature rises from ambient (about 25 degrees centigrade) to around 538 degrees centigrade in five minutes.

The intercalated graphite flake contains trace amounts of nitric acid on the surface of the graphite flake and sulfuric acid, air, and water entrapped within the layers of the graphite flake. During a typical burn test, the trace nitric acid is liberated and acts as a blowing agent. In addition, the entrapped sulfuric acid, air, and water vaporize and cause the graphite flake to expand.

The liberated acids catalyze the dipentaerythritol and graphite flake (i.e., the carbonifics), which decompose into carbon and regenerated acid. At the same time, the blowing agents release gases which cause the carbonifics to foam or intumesce. The melamine melts to form a film over the carbon to improve the continuity of the carbon foam. The char promoters improve the hardness of the carbon char that remains after the intumescent composite intumesces.

The use of dipentaerythritol and intercalated graphite flake as intumescent components ensures that the intumescent composite will begin to intumesce when the plastic pipe around which the firestop device is installed begins to soften. The intumescent composite continues to intumesce at sufficiently high rates to completely close off the wall opening. The intumescent composite forms a hard insulating char capable of withstanding the forces exerted by a stream of water from a fire hose. The resulting hard char also provides thermal insulation, smoke depression, and fire resistance.

The firestop device of FIGS. 1 and 2 is preferably manufactured by placing onto a rectangular box-shaped die a first sheet of plastic (or other material that does not easily adhere to the intumescent composite). A pre-weighed amount of the intumescent composite is then placed onto the first sheet of plastic. A second sheet of plastic is then laid over the intumescent composite. Pressure is then applied onto the second sheet of plastic with a flat plate to force the intumescent composite into the shape of the die. This step is preferably performed with the intumescent composite heated to at least 30 degrees centigrade to soften the composite. The pressure plate is then removed.

At this point, the second sheet of plastic may be removed, the pre-formed restraining layer of FIG. 1 may then be placed over the exposed, shaped intumescent composite, and the assembled firestop device may be removed from the die. Alternatively, the shaped intumescent composite may be removed from the die with both plastic sheets in place, one of the plastic sheets may then be removed, and the restraining layer may be placed over the exposed intumescent composite. In either case, the assembled firestop device will have the layer of sticky intumescent composite sandwiched between the restraining layer and a sheet of plastic. The firestop device may be installed with the remaining plastic sheet in place.

Those skilled in the art will understand that intumescent composites other than the specific preferred embodiment described herein fall within the scope of the present invention. For example, intumescent composites within the scope of the present invention may have percentages of components different from those listed in Table I. In addition, intumescent composites within the scope of the present invention may have intumescent components, blowing agents, char promoters, and/or binders other than those explicitly described herein.

While a preferred embodiment of the present invention comprises first and second intumescent components, a blowing agent, a char promoter, and a non-curing liquid binder, nevertheless those skilled in the art will understand that alternative embodiments need not comprise all five types of components to produce a composite that will intumesce. Intumescent composites of the present invention may be made with or without a blowing agent, a char promoter, and/or a non-curing liquid binder. Those skilled in the art will also understand that intumescent composites of the present invention may be made with a binder other than a non-curing liquid binder. Those skilled in the art will also understand that the first intumescent component may comprise materials other than an acid-treated graphite flake, such as other forms of graphite.

It will be further understood that various changes in the details, materials, percentages, and arrangements of the components and parts which have been described and illustrated in order to explain the nature of this invention may be made by those skilled in the art without departing from the principle and scope of the invention as expressed in the following claims.

What is claimed is:

1. An intumescent composite, comprising:

(a) a first intumescent component;

(b) a second intumescent component, wherein said first intumescent component inmmesces at a first temperature and said second intumescent component intumesces at a second temperature, wherein said second temperature is different from said first temperature, wherein:

said first intumesCent component comprises graphite; and said second intumescent component comprises a polyhydric alcohol and a melamine/uninhibited formaldehyde syrup.

2. The intumescent composite of claim 1, wherein:

said graphite comprises an acid-treated graphite flake;

said polyhydric alcohol comprises dipentaerythritol; and said melamine/uninhibited formaldehyde syrup comprises triamino-s-triazine.

3. The intumescent composite of claim 1, further comprising:

(c) a blowing agent; and (d) a char promoter.

4. The intumescent composite of claim 3, further comprising a binder, wherein said first intumescent component, said second intumescent component, said blowing agent, and said char promoter are suspended in said binder and said intumescent composite is a non-curing, moldable putty.

5. The intumescent composite of claim 4, wherein said binder comprises a plasticized rubber.

6. The intumescent composite of claim 5, wherein:

said first intumescent component comprises graphite;

said second intumescent component comprises a polyhydric alcohol and a melamine/uninhibited formaldehyde syrup;

said blowing agent comprises one or more carbonate compounds and one or more polycarbonic acids; and said char promoter comprises a chlorinated paraffin.

7. The intumescent composite of claim 6, wherein:

said graphite comprises an acid-treated graphite flake;

said polyhydric alcohol comprises dipentaerythritol;

said melamine/uninhibited formaldehyde syrup comprises triamino-s-triazine; and said plasticized rubber comprises polyisobutylene.

* * * * *